US012741297B2

(12) United States Patent
Kim et al.

(10) Patent No.: US 12,741,297 B2
(45) Date of Patent: Sep. 22, 2026

(54) PRE-COATED METAL STEEL SHEET FOR HOME APPLIANCES AND REFRIGERATORS INCLUDING THE SAME

(71) Applicant: SAMSUNG ELECTRONICS CO., LTD., Suwon-si (KR)

(72) Inventors: Choongkeon Kim, Suwon-si (KR); Youngdeog Koh, Suwon-si (KR); Kwangjoo Kim, Suwon-si (KR); Yonghwan Kim, Suwon-si (KR); Dahyun Byeon, Suwon-si (KR); Seok Rhee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 437 days.

(21) Appl. No.: 18/350,486

(22) Filed: Jul. 11, 2023

(65) Prior Publication Data

US 2024/0157396 A1 May 16, 2024

Related U.S. Application Data

(63) Continuation of application No. PCT/KR2023/009477, filed on Jul. 5, 2023.

(30) Foreign Application Priority Data

Nov. 11, 2022 (KR) ........................ 10-2022-0151059
Jan. 3, 2023 (KR) ........................ 10-2023-0000940

(51) Int. Cl.
*B05D 7/14* (2006.01)
*B05D 7/00* (2006.01)
(Continued)

(52) U.S. Cl.
CPC ................ *B05D 7/14* (2013.01); *B05D 7/57* (2013.01); *C09D 7/61* (2018.01); *C09D 7/69* (2018.01);
(Continued)

(58) Field of Classification Search
None
See application file for complete search history.

(56) References Cited

U.S. PATENT DOCUMENTS 4,517,249 A * 5/1985 Panush .................... C09D 7/41 428/458
5,147,689 A * 9/1992 Igarashi ................. B05D 7/587 427/265
(Continued)

FOREIGN PATENT DOCUMENTS

JP 5613349 10/2014
JP 2015024642 A * 2/2015 ............. B32B 15/08
(Continued)

OTHER PUBLICATIONS

Koo—KR 2003-0042765 A—PCT D3—MT—paint for refrigerator—2003 (Year: 2003).*
(Continued)

*Primary Examiner* — John Vincent Lawler
(74) *Attorney, Agent, or Firm* — STAAS & HALSEY LLP

(57) ABSTRACT

A PCM steel sheet for a home appliance and a refrigerator including the same. The PCM steel sheet may include a steel sheet, a basecoat layer provided on the steel sheet, a hairline layer formed on the basecoat layer, a clearcoat layer provided on the hairline layer, and a primer layer between the steel sheet and the basecoat layer to provide adhesion. The PCM steel sheet for a home appliance does not include a metal mesh layer. The PCM steel sheet for a home appliance may have a brightness (flop index) of about 20 or more.

15 Claims, 8 Drawing Sheets

(51) Int. Cl.
*C09D 7/40* (2018.01)
*C09D 7/61* (2018.01)
*C09D 133/08* (2006.01)
*C09D 167/00* (2006.01)

(52) U.S. Cl.
CPC ............. *C09D 7/70* (2018.01); *C09D 133/08* (2013.01); *C09D 167/00* (2013.01); *B05D 2202/10* (2013.01); *B05D 2420/01* (2013.01); *B05D 2420/02* (2013.01); *B05D 2420/03* (2013.01); *B05D 2420/04* (2013.01); *B05D 2502/00* (2013.01); *B05D 2508/00* (2013.01); *B05D 2601/02* (2013.01)

(56) References Cited

U.S. PATENT DOCUMENTS 9,624,378 B2 4/2017 Hippmann et al.
2003/0190434 A1* 10/2003 Byers ....................... B05D 7/53 428/458
2004/0028822 A1* 2/2004 Dutt ....................... B05D 7/574 427/407.1
2005/0165159 A1* 7/2005 Ogura ................ C08G 18/6254 524/560
2006/0063004 A1 3/2006 Takano et al.
2009/0311496 A1* 12/2009 Nichols .................. B05D 5/068 428/425.9
2010/0098939 A1* 4/2010 Tada ....................... C23C 28/00 428/336
2014/0072795 A1 3/2014 Kim et al.
2014/0287257 A1* 9/2014 Morishita ................ B05D 7/14 428/328
2017/0218497 A1 8/2017 Owa et al.
2018/0230326 A1* 8/2018 Hase .................... C09D 167/02
2021/0040328 A1 2/2021 Gianetti et al.
2022/0266297 A1* 8/2022 Roehr .................... B05D 7/532

FOREIGN PATENT DOCUMENTS

KR 10-2003-0042765 6/2003
KR 20030042765 A * 6/2003 ............... B05D 5/06
KR 10-0696925 3/2007
KR 10-2014-0046102 4/2014
KR 10-1727878 4/2017
KR 20170067930 A * 6/2017 ........... C09D 7/1208
KR 10-1787535 10/2017
KR 10-2019-0061465 6/2019
KR 20190061465 A * 6/2019 ............... B05D 7/24
KR 10-2020-0119854 10/2020
KR 10-2328391 11/2021

OTHER PUBLICATIONS

Choi—JP 2015-024642 A—MT—color PCM steel sheet w-multiple layers—2015 (Year: 2015).*
Roh—KR 2017-0067930 A—IDS—MT—pigment PCM sheet—2017 (Year: 2017).*
Kim—KR 2019-0061465 A—PCT D1—MT—PCM steel sheet—2019 (Year: 2019).*
International Search Report issued in International Application No. PCT/KR2023/009477 dated Oct. 17, 2023.
Written Opinion issued in International Application No. PCT/KR2023/009477 dated Oct. 17, 2023.

* cited by examiner

PRE-COATED METAL STEEL SHEET FOR HOME APPLIANCES AND REFRIGERATORS INCLUDING THE SAME

CROSS-REFERENCE TO RELATED APPLICATION

This application is a continuation application of International Application No. PCT/KR2023/009477, filed Jul. 5, 2023, which is based upon and claims priority benefit of Korean Patent Application No. 10-2022-0151059, filed on Nov. 11, 2022, and Korean Patent Application No. 10-2023-0000940, filed on Jan. 3, 2023, in the Korean Intellectual Property Office, the disclosures of each of which are incorporated by reference herein in their entirety.

BACKGROUND

1. Field

The present disclosure relates to a pre-coated metal (PCM) steel sheet for home appliances and a refrigerator including the same.

2. Description of Related Art

Conventional metal print PCM steel sheets provide less luxurious appearances than film steel sheets due to lower metallic brightness. Thus, attempts have been made to obtain high brightness in conventional metal print PCM steel sheets by applying a metal mesh coating process.

However, because the metal mesh coating process does not include an oven drying process, a subsequent printing process may be performed in a state where drying is not sufficiently conducted. In this case, a degree of contamination increases in the subsequent printing process and there are limits to implement high brightness.

Also, because a drying process is performed without an oven in the metal mesh coating process, a thin film of a thickness of 1 μm or less should be formed. Therefore, degradation of exterior appearance quality may be continuously caused due to high difficulty in the metal mesh coating process.

In addition, conventional metal print PCM steel sheets have inferior transparency and poor chemical resistance and boiling resistance because a paint including a polyester (PE) resin is used in a printing process.

SUMMARY

In accordance with an aspect of the present disclosure, a pre-coated metal (PCM) steel sheet for a home appliance may include a steel sheet, a basecoat layer provided on the steel sheet, a hairline layer formed on the basecoat layer, a clearcoat layer provided on the hairline layer, and a primer layer between the steel sheet and the basecoat layer to provide adhesion between the steel sheet and the basecoat layer. The PCM steel sheet for a home appliance is characterized in that the PCT steel sheet is without a metal mesh layer. The PCM steel sheet for a home appliance may have a brightness (flop index) of about 20 or more.

In accordance with another aspect of the present disclosure, a method of manufacturing a pre-coated metal (PCM) steel sheet for a home appliance may include preparing a steel sheet, coating a primer layer on the steel sheet, coating a basecoat layer on the primer layer, forming a hairline layer on the basecoat layer, and coating a clearcoat layer on the hairline layer. The method for manufacturing the PCM steel sheet for home appliances is characterized in that the PCT steel sheet is without a metal mesh layer.

In accordance with another aspect of the present disclosure, a refrigerator may include a main body, a storage compartment in the main body, and a door coupled to the main body to open and close at least one portion of the storage compartment. The door may include a PCM steel sheet. The PCM steel sheet may include a steel sheet, a basecoat layer provided on the steel sheet, a hairline layer formed on the basecoat layer, a clearcoat layer provided on the hairline layer, and a primer layer between the steel sheet and the basecoat layer to provide adhesion between the steel sheet and the basecoat layer. The PCM steel sheet is characterized in that the PCT steel sheet is without a metal mesh layer. The PCM steel sheet may have a brightness (Flop Index) of about 20 or more.

DETAILED DESCRIPTION

Figure 1:
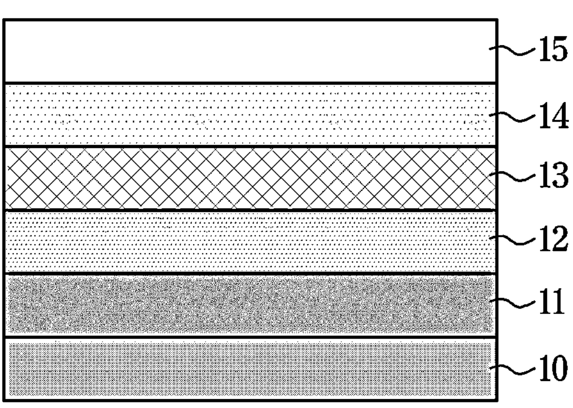
FIG. 1 is a schematic diagram illustrating a conventional metal print PCM steel sheet.

Hereinafter, embodiments of the present disclosure will be described in detail with reference to the accompanying drawings. These embodiments are provided to fully convey the concept of the present disclosure to those of ordinary skill in the art. The present disclosure may, however, be embodied in many different forms and should not be construed as limited to the exemplary embodiments set forth herein. In the drawings, parts unrelated to the descriptions are omitted for clear description of the disclosure and sizes of elements may be exaggerated for clarity.

Throughout the specification, the term "comprising" or "including" an element specifies the presence of the stated element, but does not preclude the presence or addition of one or more elements, unless otherwise stated.

An expression used in the singular encompasses the expression of the plural, unless otherwise indicated.

It will also be understood that when an element is referred to as being "on" another element, it can be directly on the other element, or intervening elements may also be present.

A pre-coated metal (PCM) steel sheet for home appliances according to the present disclosure includes a steel sheet, a basecoat layer provided on the steel sheet to improve an exterior appearance, a hairline layer formed on the basecoat layer, a clearcoat layer provided on the hairline layer to improve durability, and a primer layer located between the steel sheet and the basecoat layer to provide adhesion.

Provided are a pre-coated metal (PCM) steel sheet having high brightness by using an acrylic resin and a refrigerator including the same.

Provided are a PCM steel sheet for home appliances having improved chemical resistance and boiling resistance and a refrigerator including the same.

Provided are a PCM steel sheet for home appliances having improved workability and increased quality uniformity by omitting a metal mesh coating process and a refrigerator including the same.

The technical problems to be solved are not limited to the technical problems as described above, and thus other technical problems may be inferred by those of ordinary skill in the art based on the following descriptions.

FIG. 1 is a schematic diagram illustrating a conventional metal print PCM steel sheet.

Referring to FIG. 1, a conventional metal print PCM steel sheet 1 may include a steel sheet 10, a primer layer 11, a basecoat layer 12, a metal mesh layer 13, a hairline layer 14, and a clearcoat layer 15.

The basecoat layer 12 may be provided on the steel sheet 10.

The primer layer 11 may be provided between the steel sheet 10 and the basecoat layer 12.

The metal mesh layer 13 may be provided on the basecoat layer 12.

The metal mesh layer 13 may serve to implement high brightness by coating a mirror ink on the entire surface. Due to a very high price of the mirror ink, the metal mech layer 13 may be formed as a thin layer. In addition, a metal mesh coating process does not include an oven drying process, and thus there is a need to form a thin layer. Preferably, a thickness of the metal mesh layer 13 may be 1 μm or less. However, it is difficult to maintain uniform quality due to high difficulty in a process of forming a thin metal mesh layer 13.

The hairline layer 14 may be provided on the metal mesh layer 13. In the hairline layer 14, a polyester (PE) resin may be used to improve workability. However, because the PE resin is a crystalline resin and opaque, low brightness may be obtained in the case of using the polyester (PE) resin. Also, because the polyester (PE) resin has low binding strength, chemical resistance and boiling resistance may deteriorate in the case of using the polyester (PE) resin.

The clearcoat layer 15 may be provided on the hairline layer 14. Like the hairline layer 14, a polyester (PE) resin may be used in the clearcoat layer 15. Therefore, although the clearcoat layer 15 constitutes the outermost surface of the steel sheet, chemical resistance and boiling resistance thereof may be poor.

Figure 2:
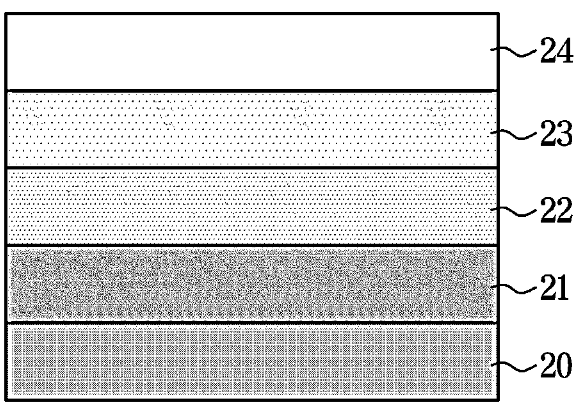
FIG. 2 is a schematic diagram illustrating a PCM steel sheet for home appliances according to an embodiment.

FIG. 2 is a schematic diagram illustrating a PCM steel sheet for home appliances according to an embodiment.

Referring to FIG. 2, the PCM steel sheet 2 for home appliances according to an embodiment may include a steel sheet 20, a primer layer 21, a basecoat layer 22, a hairline layer 23, and a clearcoat layer 24.

The steel sheet 20 may include at least one of an electrolytic galvanized iron (EGI) steel sheet and a galvanized iron (GI) steel sheet. However, the embodiment is not limited thereto, and types of the steel sheet may vary according to purposes and functions thereof. For example, the steel sheet 20 may be a stainless-steel sheet, a cold-rolled steel sheet, or the like.

The basecoat layer 22 may be provided on the steel sheet 20 to implement various colors or increase metallic texture, thereby improving the exterior appearance.

The basecoat layer 22 may include an acrylic resin.

In general, plastics may be classified into crystalline resins and amorphous resins according to molecular structures thereof. The amorphous resins having irregular molecular structures are transparent because there is no region for scattering. On the contrary, the crystalline resins having regular molecular structures are opaque because scattering occurs between a crystalline region and an amorphous region.

The crystalline resin may be polyester (PE), polyamide (PA), acetal=POM, polypropylene (PP), polycarbonate (PC), or the like. The conventional metal print PCM steel sheet 1 is formed using polyester (PE) in consideration of workability. Therefore, the conventional metal print PCM steel sheet 1 has low brightness because the basecoat layer is opaque.

The amorphous resin may be polycarbonate (PC), PVC, ABS, polystyrene (PS), polyvinyl chloride, an acrylic resin, or the like. In the present disclosure, high brightness is realized by increasing transparency of a steel sheet-coating layer using an acrylic resin. However, the embodiment is not limited thereto, and any other types of amorphous resins may be used to increase transparency of the steel sheet-coating layer.

The basecoat layer 22 may include a metallic pigment.

The metallic pigment is a pigment shining by partially reflecting light. Therefore, the basecoat layer 22 may have improved metallic texture and increased brightness by including the metallic pigment.

The metallic pigment may be in the form of elliptical particles with long major axes. Preferably, the metallic pigment may have a major axis of 12 to 18 μm, more preferably, 16 to 18 μm.

Figure 3:
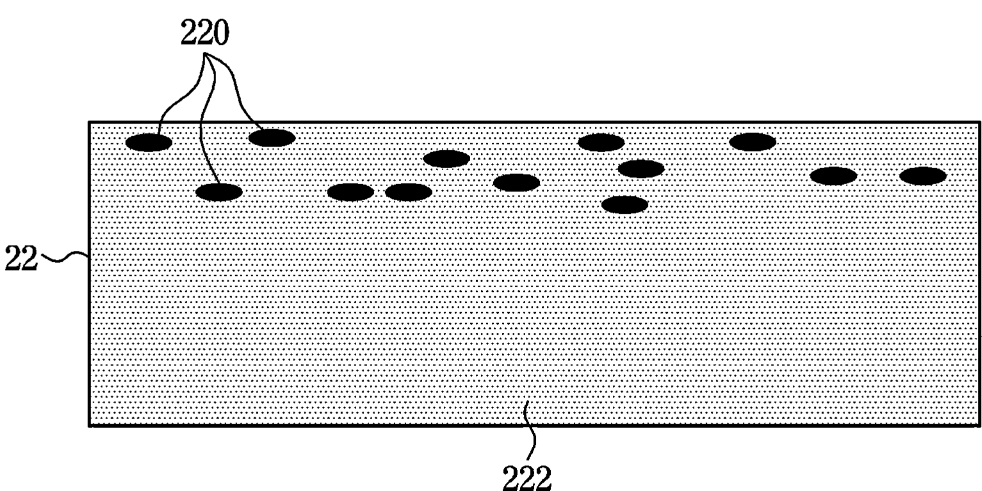
FIG. 3 is a schematic diagram to describe a change in brightness according to major axes of a metallic pigment.
Figure 4:
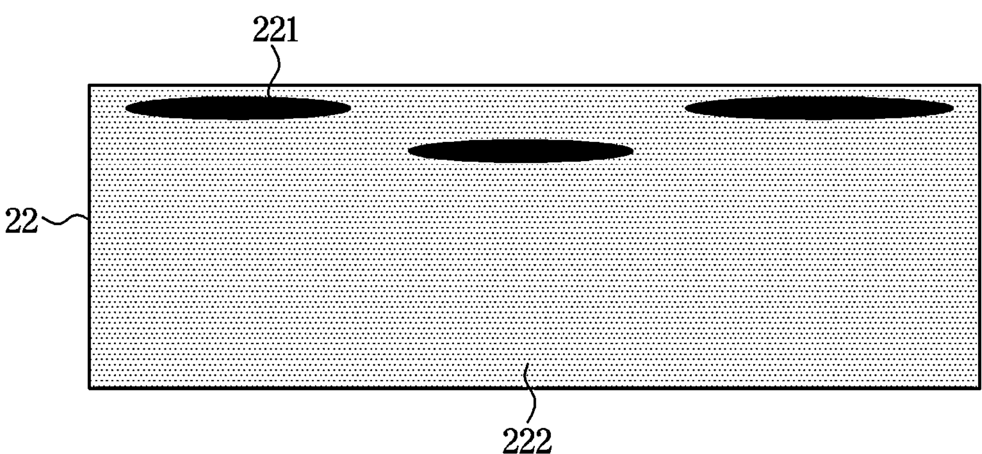
FIG. 4 is a schematic diagram to describe a change in brightness according to major axes of a metallic pigment.

FIGS. 3 and 4 are schematic diagrams to describe a change in brightness according to major axes of a metallic pigment.

Brightness of a surface of a steel sheet may vary according to a specular reflection rate of light. For example, as a specular reflection rate of light on the surface of the steel sheet increases, brightness increases.

Referring to FIGS. 3 and 4, in the case where the basecoat layer 22 includes a metallic pigment 220 with a short major axis, the specular reflection rate of light decreases. Therefore, brightness may decrease in the case where in the basecoat layer 22 includes a metallic pigment 220 with a short major axis.

However, in the case where the basecoat layer 22 includes a metallic pigment 221 with a long major axis, the specular reflection rate of light increases. Therefore, brightness may increase in the case where the basecoat layer 22 includes a metallic pigment 221 with a long major axis. In the present disclosure, high brightness is realized by using a metallic pigment with a long major axis of 12 μm or more.

However, a too long major axis of the metallic pigment may cause deterioration of surface roughness due to protrusions formed on the surface of the steel sheet. As a result, scratches may occur while a coating roll passes over the surface during a subsequent coating process. That is, a too long major axis of the metallic pigment may cause deterioration in surface quality of the steel sheet. Therefore, the major axis of the metallic pigment may be 18 μm or less in the present disclosure.

The basecoat layer 22 may include a solvent with a boiling point of 160° C. to 220° C. Preferably, a solvent with a boiling point of 170° C. to 210° C. may be used.

The metallic pigment is not dissolved in a solvent but dispersed therein. In response to application of a paint for the basecoat layer on the primer layer, the metallic pigment slowly floats on the basecoat layer 22 and the solvent evaporates. Therefore, in accordance with an evaporation rate, distribution of the metallic pigment in the basecoat layer 22 may vary.

Figure 5:
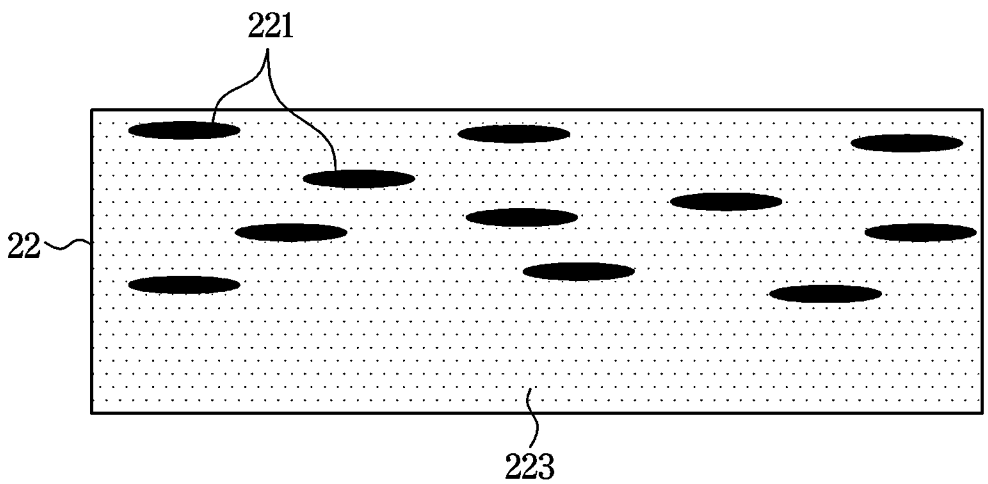
FIG. 5 is a schematic diagram to describe a change in brightness according to boiling points of a solvent of a basecoat layer.
Figure 6:
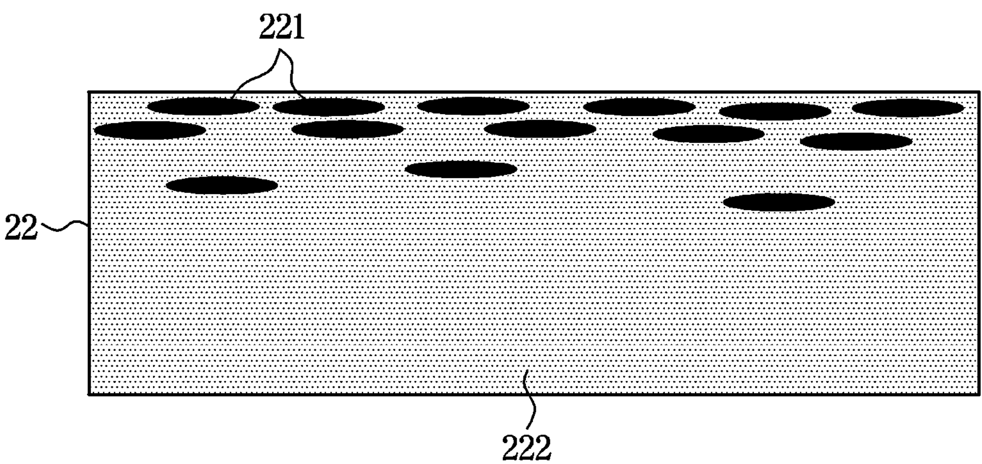
FIG. 6 is a schematic diagram to describe a change in brightness according to boiling points of a solvent of a basecoat layer.

FIGS. 5 and 6 are schematic diagrams to describe a change in brightness according to boiling points of a solvent of a basecoat layer.

Referring to FIGS. 5 and 6, in a basecoat layer 22 including a solvent 223 having a low boiling point, the solvent 223 completely evaporates in a state where the metallic pigment 221 does not sufficiently float on the basecoat layer 22. Therefore, a low boiling point of the solvent may cause a decrease in the specular reflection rate of light by the metallic pigment 221, resulting in a decreases in brightness.

However, in a basecoat layer 22 including a solvent 222 having a high boiling point, the solvent 22 evaporates after the metallic pigment 221 sufficiently floats on the basecoat layer 22. Therefore, a high boiling point of the solvent causes an increase in the specular reflection rate, resulting in an increase in brightness.

However, a too high boiling point of the solvent may cause a decrease in the specular reflection rate because the solvent contained inside cannot evaporate but remains therein after the surface of the basecoat layer 22 is cured. Therefore, in the present disclosure, a solvent with a boiling point of 160° C. to 220° C. may be used, preferably, a solvent with a boiling point of 170° C. to 210° C. may be used.

The hairline layer 23 may be formed on the basecoat layer to improve luxurious appearance by increasing metallic texture.

The hairline layer 23 may include an acrylic resin.

The hairline layer 14 of the conventional metal print PCM steel sheet 1 is formed by using a print ink including a polyester (PE) resin having excellent processibility. However, due to low binding strength of the polyester (PE) resin, the conventional metal print PCM steel sheet 1 has poor chemical resistance and boiling resistance.

In the present disclosure, as described above, high brightness is realized by increasing transparency by forming the hairline layer 23 using an acrylic resin.

Also, due to high binding strength of the acrylic resin, the PCM steel sheet 2 for home appliances according to an embodiment may have improved chemical resistance and boiling resistance.

Meanwhile, the acrylic resin contained in the hairline layer 23 may have a molecular weight (Mw) of 70,000 to 90,000.

Due to high binding strength, the acrylic resin may have low processibilty. Particularly, an acrylic resin having a low molecular weight may have far lower processibility because chains in a molecular structure are short in length. Therefore, in the present disclosure, processibility is improved by using an acrylic resin having a high molecular weight. That is, by using an acrylic resin with a high molecular weight of 70,000 to 90,000, excellent processibility may be obtained simultaneous improving chemical resistance and boiling resistance.

The clearcoat layer 24 may be provided on the outermost side of the PCM steel sheet to protect the exterior appearance of the PCM steel sheet.

The clearcoat layer 24 may include at least one of an acrylic resin and a polyester (PE) resin. The acrylic resin may be used to improve all of chemical resistance, boiling resistance, and processibility, and the polyester (PE) resin may be used to improve processibility.

The primer layer 21 may be disposed between the steel sheet 20 and the basecoat layer 22 to provide adhesion between the steel sheet 20 and the basecoat layer 22 and improve corrosion resistance.

The primer layer 21 may include a black primer having a colorimetric L-value of 20 to 30.

Silica and $TiO_2$ components used in primers are while in color. In conventional metal print PCM steel sheets 1, white-based primers have been used without adding other colors thereto. Therefore, brightness thereof was low because a coating layer with a bright color is formed on the primer layer with a white-based color.

In the PCM steel sheet 2 for home appliances according to an embodiment, the primer layer 21 is formed by using a black primer. Therefore, the PCM steel sheet 2 for home appliances according to an embodiment may implement high brightness by luminosity contrast because a coating layer with a bright color is formed on the black primer layer 21.

However, in the case where the black primer has a too colorimetric L-value, contents of a resin and a rust preventing additive in the primer decrease, and thus corrosion resistance may deteriorate. Therefore, in the present disclosure, a black primer having a colorimetric L-value of 20 to 30 may be used.

The PCM steel sheet 2 for home appliances according to an embodiment may be characterized in that a metal mesh layer is not included.

According to the metal mesh coating process of the conventional metal print PCM steel sheet 1 not including an oven drying process, a subsequent coating process may be conducted without a sufficient curing process. In this case, the degree of contamination of the layer formed by a subsequent coating process may increase due to insufficient drying. As the degree of contamination of the coating layer increases, the specular reflection rate of the surface of the steel sheet decreases, resulting in deterioration in brightness. Therefore, there are limits to implement high brightness in the conventional metal print PCM steel sheet 1.

According to an embodiment, the degree of contamination of a coating layer formed by a subsequent coating process may be minimized by omitting the metal mesh layer and conducting an oven drying process after forming the basecoat layer. Therefore, according to an embodiment of the present disclosure, high brightness may be implemented by increasing the specular reflection rate of the surface of the steel sheet.

The conventional metal print PCM steel sheet 1 had a brightness of 13 to 17. However, in the present disclosure, the PCM steel sheet 2 for home appliances according to an embodiment may have a brightness (flop index) of 20 or more by including a component capable of increasing brightness.

Hereinafter, a method for manufacturing a PCM steel sheet for home appliances according to another embodiment of the present disclosure will be described.

The method for manufacturing a PCM steel sheet for home appliances according to the present disclosure may include preparing a steel sheet, coating a primer layer on the steel sheet, coating a basecoat layer on the primer layer, forming a hairline layer on the basecoat layer, and coating a clearcoat layer on the hairline layer.

First, the steel sheet 20 may be prepared. For example, a steel sheet including at least one of an electrolytic galvanized iron (EGI) steel sheet and a galvanized iron (GI) steel sheet may be prepared. However, the embodiment is not limited thereto, types of the steel sheet may vary according to purposes and functions thereof. For example, the steel sheet 20 may be a stainless-steel sheet, a cold-rolled steel sheet, or the like.

After preparing the steel sheet 20, a pretreatment process may be performed. The pretreatment process may be performed by any method commonly used in the art to provide adhesion in a subsequent coating process.

Then, the primer layer 21 may be coated on the steel sheet.

In coating of the primer layer 21, a black primer paint having a colorimetric L-value of 20 to 30 may be used. Therefore, the PCM steel sheet 2 for home appliances according to an embodiment may have high brightness by luminosity contrast by forming a coating layer with a bright color on the black primer layer 21.

The basecoat layer 22 may be coated on the primer layer 21.

In coating of the basecoat layer 22, an acrylic resin paint may be used. The acrylic resin paint may include a metallic pigment, and the metallic pigment may have a major axis of 12 to 18 μm. The acrylic resin paint may also include a solvent with a boiling point of 160° C. to 220° C. Therefore, high brightness may be realized by increasing the specular reflection rate of the surface of the steel sheet.

The hairline layer 20 may be formed on the basecoat layer 22.

In formation of the hairline layer 23, a print ink including an acrylic resin may be used. The acrylic resin may have a molecular weight (Mw) of 70,000 to 90,000. Therefore, the hairline layer 23 formed of a prink ink including the acrylic resin may have excellent processibilty simultaneously with improved chemical resistance and boiling resistance.

On the hairline layer 23, the clearcoat layer 24 may be coated.

In coating of the clearcoat layer 24, a paint including at least one of an acrylic resin and a polyester (PE) resin may be used. In the case of improving all of chemical resistance, boiling resistance, and processibility, the acrylic resin may be used. In the case of improving processibility, the polyester (PE) resin may be used.

The method for manufacturing a PCM steel sheet for home appliances may be characterized in that a metal mesh coating process is not performed. According to an embodiment of the present disclosure, by omitting the metal mesh layer and performing an oven drying process after forming the basecoat layer, the degree of contamination of a layer formed by a subsequent coating process may be minimized. Therefore, according to an embodiment of the present disclosure, high brightness may be realized by increasing the specular reflection rate of the surface of the steel sheet.

Hereinafter, a refrigerator according to another embodiment of the present disclosure will be described.

A refrigerator according to the present disclosure may include a main body, a storage compartment provided in the main body, and a door coupled to the main body to open and close at least one portion of the storage compartment. The door may include a PCM steel sheet.

The PCM steel sheet may include a steel sheet, a basecoat layer provided on the steel sheet to improve an exterior appearance, a hairline layer formed on the basecoat layer, a clearcoat layer provided on the hairline layer to improve durability, and a primer layer located between the steel sheet and the basecoat layer to provide adhesion.

The PCM steel sheet may be characterized in that a metal mesh layer is not formed. The PCM steel sheet has a brightness (flop index) of 20 or more.

The PCM steel sheet 2 is described above, and hereinafter, a refrigerator according to an embodiment of the present disclosure will be described in detail.

Figure 7:
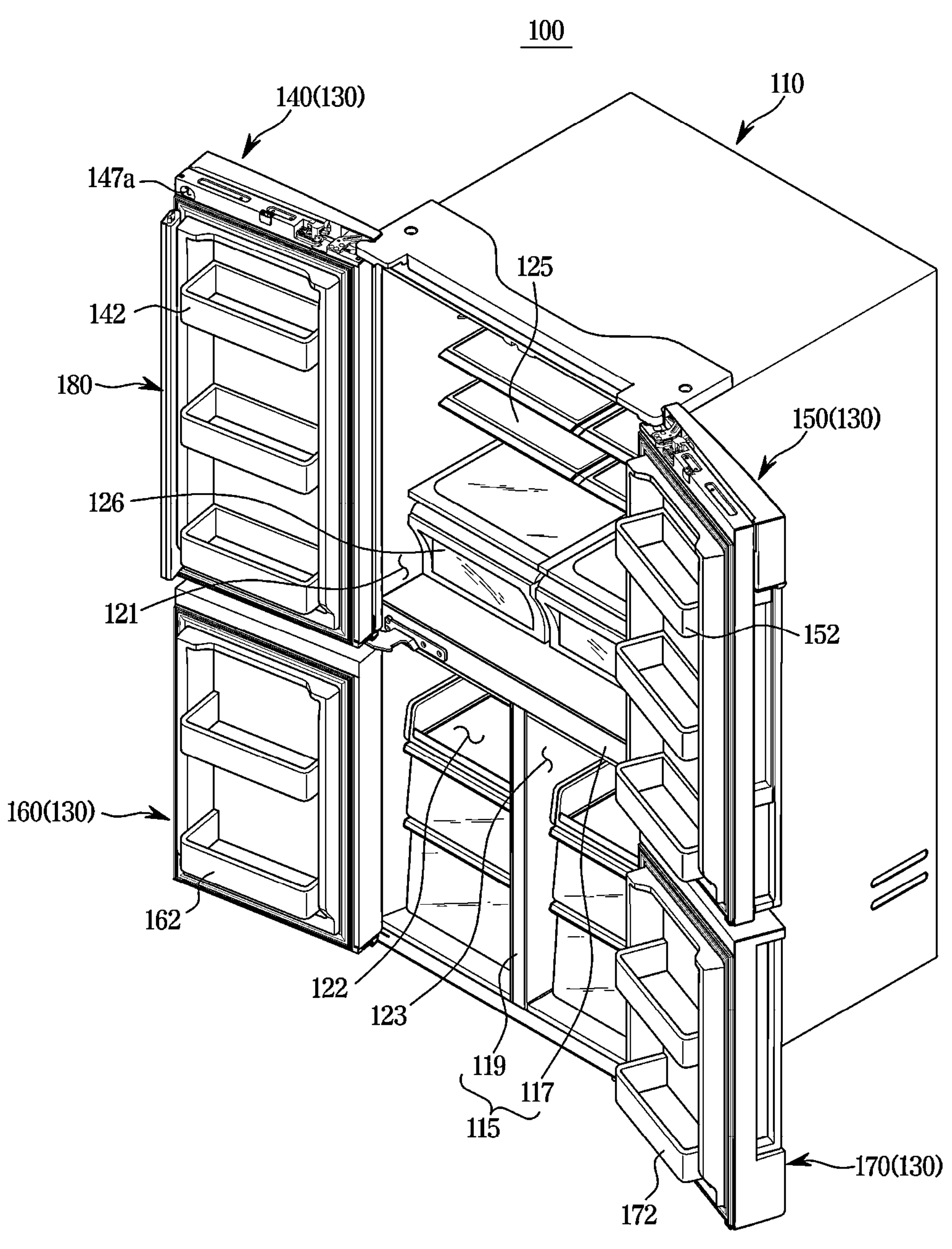
FIG. 7 is a schematic diagram illustrating a refrigerator according to an embodiment.

FIG. 7 is a schematic diagram illustrating a refrigerator according to an embodiment.

Referring to FIG. 7, a refrigerator 100 according to an embodiment of the present disclosure may include a main body 110, and storage compartments 121, 122, and 123 formed in the main body 110 to be vertically partitioned. The refrigerator 100 may include doors 130 opening and closing the storage compartments 121, 122, and 123, and a cool air supply device (not shown) configured to supply cool air to the storage compartments 121, 122, and 123.

The door 130 may include the PCM steel sheet 2.

The main body 110 may include inner cabinets defining the storage compartments 121, 122, and 123, outer cabinets coupled to outer sides of the inner cabinets to define an exterior appearance, and an insulation material foamed between the inner cabinets and the outer cabinets to insulate the storage compartments 121, 122, and 123.

The storage compartments 121, 122, and 123 may be divided into a plurality of sections by a partition 115, and a plurality of shelves 125 and storage containers 126 may be provided in the storage compartments 121, 122, and 123 to store food, and the like.

The storage compartments 121, 122, and 123 may be divided into a plurality of storage compartments 121, 122, and 123 by the partition 115, and the partition 115 may include a first partition 117 arranged in a horizontal direction to divide the storage compartments 121, 122, and 123 into a first storage compartment 121 and second storage compartments 122 and 123, and a second partition 119 coupled to the second storage compartments 122 and 123 in the longitudinal direction to divide the second storage compartments 122 and 123 into a first lower storage compartment 122 and a second lower storage compartment 123.

The partition 115 having a T-shape in which the first partition 117 is coupled to the second partition 119 may divide the storage compartments 121, 122, and 123 into three spaces. Among the first storage compartment 121 and the second storage compartments 122 and 123 divided by the first partition 117, the first storage compartment 121 may be used as a refrigeration compartment, and the second storage compartments 122 and 123 may be used as freezer compartments.

The division of the storage compartments 121, 122, and 123 as described above is an example and each of the storage compartments 121, 122, and 123 may be used in any manner different from the above-described configuration.

The first storage compartment 121 and the second storage compartments 122 and 123 may be opened and closed respectively by the doors 130 pivotally coupled to the main body 110.

The door 130 may include a pair of first storage compartment doors 140 and 150 pivotally coupled to the main body 110 to open and close the first storage compartment 121, and a pair of second storage compartment doors 160 and 170 pivotally coupled to the main body 110 to open and close the second storage compartments 122 and 123.

At least one of the pair of first storage compartment doors 140 and 150 may be provided with a rotating bar covering a gap between the pair of first storage compartment doors 140 and 150 when the pair of first storage compartment doors 140 and 150 are closed. The rotating bar may be rotatably coupled to at least one of the pair of first storage compartment doors 140 and 150. The rotating bar may be guided to rotate in accordance with the opening/closing of one of the first storage compartment doors 140 and 150 to which the rotating bar is coupled by a rotating guide formed at the inner cabinet.

Rear surfaces of the pair of first storage compartment doors 140 and 150 may be provided with door shelves 142 and 152 for food storage, respectively. Rear surfaces of the pair of second storage compartment doors 160 and 170 may be provided with door shelves 162 and 172 for food storage, respectively.

Meanwhile, a blower fan may be installed at one or more of the pair of first storage compartment doors 140 and 150 to prevent dew formation on side surfaces constituting a gap G between the pair of first storage compartment doors 140 and 150 when the pair of first storage compartment doors 140 and 150 are closed. An inlet 147*a* may be provided at an upper portion of at least one of the pair of first storage compartment doors 140 and 150 to introduce air into the blower fan. An outlet may be provided at a side surface to blow air into the gap G between the pair of first storage compartment doors 140 and 150.

The pair of first storage compartment doors 140 and 150 may include a first door 140 and a second door 150 provided at one side of the first door 140. However, the embodiment is not limited thereto, and the first door and the second door may be provided as a first door 160 of the pair of second storage compartment doors 160 and 170 and a second door 170 provided at one side of the first door 160.

The embodiment is not limited to the door structure mounted with a fan case accommodating the blower fan or a guide duct as shown in FIG. 7 and the refrigerator may include a plurality of doors arranged sequentially.

Hereinafter, the present disclosure will be described in more detail with reference to the following examples and comparative examples. However, the following examples are merely presented to exemplify the present disclosure, and the scope and effects of the present disclosure is not limited thereto.

EXAMPLES

<Measurement of Brightness>

Evaluation results on brightness and corrosion resistance according to colorimetric L-values of black primers are listed in Table 1 below.

First, samples including black primers with different colorimetric L-values were prepared. Steel sheets, basecoat layers, hairline layers, and clearcoat layers of the samples were the same. For example, the steel sheet was an EGI steel sheet, a basecoat layer included a metallic pigment with a major axis of 16 μm and a solvent having a boiling point of 200° C., a hairline layer included an acrylic resin with a molecular weight of 80,000, and a clearcoat layer included an acrylic resin.

Brightness was measured at room temperature using an X-Rite MA68 II and digitized by flop index using reflectance of light at different angles of a metallic pigment. Reflectance of the metallic pigment was measured at angles 15°, 45°, and 115°.

Brightness expressed as a numerical value of flop index has no unit.

Corrosion resistance was measured by forming an X-shaped groove with one side of 2 mm on the surface of each sample and adding the sample to a corrosion resistance evaluating chamber. The chamber was set to provide an environment having a NaCl concentration of 5%, a temperature of 35° C.±2° C. and a humidity of 90%±5%.

As a result of evaluating corrosion resistance, a case in which no swelling, exfoliation, and corrosion exceeding 2 mm occurred in the X-shaped groove was marked by 'O', and a case in which at least one of swelling, exfoliation, and corrosion exceeding 2 mm occurred in the X-shaped groove was marked 'X'.

TABLE 1

| | Colorimetric L-value | | | | | | | | | |
|---|---|---|---|---|---|---|---|---|---|---|
| Category | 80 | 70 | 50 | 45 | 40 | 35 | 30 | 25 | 20 | 15 |
| Brightness | 11.01 | 12.52 | 15.74 | 18.49 | 18.52 | 18.93 | 23.38 | 25.40 | 25.43 | 25.78 |
| Corrosion resistance | O | O | O | O | O | O | O | O | O | X |

Referring to Table 1, when the colorimetric L-value was 30 or more, the samples satisfied the brightness of 20 or more. However, when the L-value of the colorimetric L-value was 20 or less, the samples did not satisfy the corrosion resistance. That is, in the case of using the black primer having a colorimetric L-value of 20 to 30, both desired high brightness and corrosion resistance were satisfied.

In Table 2, changes in brightness and evaluation results on appearance according to the length of the major axis of the metallic pigment are shown.

In this case, the major axis of the metallic pigment was expressed as an average. The average refers to a median length (D50) in a distribution chart in which particles are accumulated in the order of particle diameter from the smallest particle to the largest particle.

First, samples having different major axes of metallic pigments were prepared. Steel sheets, primer layers, boiling points of solvents of basecoat layers, hairline layers, and clearcoat layers of the samples were the same. For example, the steel sheet was an EGI steel sheet, a colorimetric L-value of the primer layer was 25, the basecoat layer included a solvent having a boiling point of 200° C., the hairline layer included an acrylic resin having a molecular weight of 80,000, and the clearcoat layer included an acrylic resin.

Brightness was measured at room temperature using an X-Rite MA68 II and digitized by flop index using reflectance of light at different angles of a metallic pigment. Reflectance of the metallic pigment was measured at angles 15°, 45°, and 115°.

Brightness expressed as a numerical value of flop index has no unit.

Evaluation was performed on the exterior appearances by marking a case in which scratches occurred on the surface of the PCM steel sheet by 'X', and marking a case in which scratches did not occur by 'O. In this regard, scratches with a depth greater than 50 mm were counted.

TABLE 2

| | Length of major axis of metallic pigment (μm) | | | | | | | |
|---|---|---|---|---|---|---|---|---|
| Category | 7 | 10 | 14 | 17 | 19 | 22 | 27 | 30 |
| Brightness | 17 | 19 | 23 | 24 | 24 | 25 | 26 | 28 |
| Appearance | ○ | ○ | ○ | ○ | X | X | X | X |

Referring to Table 2, it was confirmed that higher brightness was obtained at a longer major axis of the metallic pigment. However, at a too long major axis of the metallic pigment, scratches occur due to protrusions on the surface, resulting in marring of the exterior appearance. Therefore, it was confirmed that the major axis of the metallic pigment should be appropriately controlled to obtain high brightness simultaneously satisfying desirable quality of the exterior appearance.

Table 3 below shows changes in brightness according to boiling points of the solvent of the basecoat layer.

First, samples were prepared to have different boiling points of the solvents of the basecoat layers. Steel sheets, primer layers, lengths of major axes of metallic pigments of basecoat layers, hairline layers, and clearcoat layers of the samples were the same. For example, the steel sheet was an EGI steel sheet, and a colorimetric L-value of the primer layer was 25, a metallic pigment with a major axis of 16 μm was used in the basecoat layer, the hairline layer included an acrylic resin having a molecular weight of 80,000, and the clearcoat layer included an acrylic resin.

Brightness was measured at room temperature using an X-Rite MA68 H and digitized by flop index using reflectance of light at different angles of a metallic pigment. Reflectance of the metallic pigment was measured at angles 15°, 45°, and 115°).

Brightness expressed as a numerical value of flop index has no unit.

TABLE 3

| | Boiling point of solvent of basecoat layer (° C.) | | | | | | | |
|---|---|---|---|---|---|---|---|---|
| Category | 150 | 160 | 170 | 180 | 190 | 200 | 210 | 220 |
| Brightness | 18.4 | 20.6 | 22.7 | 23.8 | 24.2 | 24.1 | 23.9 | 21.8 |

Referring to Table 3, it was confirmed that brightness was higher at a higher boiling point of the solvent of the basecoat layer. However, at a too high boiling point of the solvent of the basecoat layer, brightness decreased because the solvent contained inside could not evaporate after the surface of the basecoat layer was cured. Therefore, high brightness property may be obtained by using a solvent with a boiling point of 160° C. to 220° C.

<Evaluation on Processibility>

Processibility was evaluated by measuring colorimetry deviation of a plurality PCM steel sheet manufactured using the method for manufacturing a PCM steel sheet for home appliances according to the present disclosure.

Two process lines to which the method for manufacturing a PCM steel sheet for home appliances according to the present disclosure was applied were designed. Then, a PCM steel sheet with a length of 150 m was prepared in each process line and cut into pieces to prepare 20 samples in total.

Table 4 show measured colorimetric values of the 20 samples.

The colorimetric values were measured by using L*a*b color colorimetric scale with Spectrophotometer CM-2600d.

TABLE 4

| | Colorimetric values | | | | | | | | | | | |
|---|---|---|---|---|---|---|---|---|---|---|---|---|
| | First process line | | | | | | Second process line | | | | | |
| Category | L | a | b | Deviation of L | Deviation of a | Deviation of b | L | a | b | Deviation of L | Deviation of a | Deviation of b |
| #1 | 71.63 | −0.46 | 0.74 | 0.13 | −0.06 | 0.04 | 71.9 | −0.45 | 0.68 | 0.4 | −0.05 | −0.02 |
| #2 | 71.93 | −0.46 | 0.77 | 0.43 | −0.06 | 0.07 | 72.08 | −0.56 | 0.65 | 0.58 | −0.16 | −0.05 |
| #3 | 71.42 | −0.44 | 0.85 | 0.08 | −0.04 | 0.15 | 71.97 | −0.44 | 0.69 | 0.47 | −0.04 | −0.01 |
| #4 | 71.26 | −0.46 | 0.83 | 0.24 | −0.06 | 0.13 | 71.95 | −0.46 | 0.73 | 0.45 | −0.06 | 0.03 |
| #5 | 71.77 | −0.44 | 0.73 | 0.27 | −0.04 | 0.03 | 71.45 | −0.45 | 0.73 | 0.05 | −0.05 | 0.03 |
| #6 | 71.81 | −0.46 | 0.78 | 0.31 | −0.06 | 0.08 | 71.35 | −0.44 | 0.77 | 0.15 | −0.04 | 0.07 |
| #7 | 71.68 | −0.46 | 0.8 | 0.18 | −0.06 | 0.1 | 71.85 | −0.43 | 0.69 | 0.35 | −0.03 | −0.01 |
| #8 | 71.99 | −0.47 | 0.74 | 0.49 | −0.07 | 0.04 | 72.25 | −0.44 | 0.6 | 0.75 | −0.04 | −0.1 |
| #9 | 71.47 | −0.45 | 0.82 | 0.03 | −0.05 | 0.12 | 71.99 | −0.42 | 0.64 | 0.49 | −0.02 | −0.06 |
| #10 | 71.85 | −0.45 | 0.79 | 0.35 | −0.05 | 0.09 | 71.71 | −0.45 | 0.68 | 0.21 | −0.05 | −0.02 |
| Average deviation | — | — | — | 0.25 | 0.06 | 0.09 | — | — | — | 0.39 | 0.05 | 0.05 |

Colorimetry deviation values of the conventional metal print PCM steel sheet 1 were about L±1.5, a±0.5, and b±0.7.

Referring to Table 4, in the case of using the method for manufacturing a PCM steel sheet for home appliances according to the present disclosure, colorimetry deviation values were L: 0.25 to 0.39, a: 0.05 to 0.06 and b: 0.05 to 0.09, indicating very small quality deviation.

That is, according to the PCM steel sheet for home appliances and the method for manufacturing the same according to the present disclosure, manufacturability was improved by omitting formation of the metal mesh layer. Therefore, in the case of applying the method for manufacturing the PCM steel sheet for home appliances according to the present disclosure, quality deviation of products may be reduced.

Figure 8:
FIG. 8 is an image of a PCM steel sheet for home appliances according to an embodiment.

FIG. 8 is an image of a PCM steel sheet for home appliances according to an embodiment.

Referring to FIG. 8, it may be confirmed that the PCM steel sheet for home appliances according to the present disclosure had an improved exterior appearance by realizing high brightness.

The PCM steel sheet for home appliances according to the present disclosure may include a steel sheet, a basecoat layer provided on the steel sheet to improve an exterior appearance, a hairline layer formed on the basecoat layer, a clearcoat layer provided on the hairline layer to improve durability, and a primer layer located between the steel sheet and the basecoat layer to provide adhesion.

The PCM steel sheet for home appliances may be characterized in that the metal mesh layer is not formed. Therefore, processability may be improved.

The PCM steel sheet for home appliances has a brightness (flop index) of 20 or more. Therefore, a PCM steel sheet having an improved exterior appearance may be provided.

The steel sheet may include at least one of an electrolytic galvanized iron (EGI) steel sheet and a galvanized iron (GI) steel sheet.

The basecoat layer may include an acrylic resin having high transparency.

The basecoat layer may improve metallic texture by including the metallic pigment.

The metallic pigment may have a major axis of 12 to 18 μm. Thus, the specular reflection rate of the surface of the steel sheet may be increased.

The basecoat layer may include a solvent with a boiling point of 170° C. to 210° C. Therefore, the metallic pigment may be distributed on an upper portion of the basecoat layer to increase the specular reflection rate of the surface of the steel sheet.

The hairline layer may include a transparent acrylic resin.

The acrylic resin may have a molecular weight (Mw) of 70,000 to 90,000. Therefore, all of the chemical resistance, boiling resistance, and processibility may be satisfied.

The clearcoat layer may include at least one of an acrylic resin and a polyester (PE) resin.

The primer layer may include a black primer having a colorimetric L-value of 20 to 30. Thus, high brightness property may be obtained by luminosity contrast.

The method for manufacturing a PCM steel sheet for home appliances according to the present disclosure may include preparing a steel sheet, coating a primer layer on the steel sheet, coating a basecoat layer on the primer layer, forming a hairline layer on the basecoat layer, and coating a clearcoat layer on the hairline layer.

The method for manufacturing the PCM steel sheet for home appliances may be characterized in that the metal mesh layer is not formed. Therefore, processability may be increased.

In coating of the primer layer, a black primer paint having a colorimetric L-value of 20 to 30 may be used.

In coating of the basecoat layer, an acrylic resin paint may be used.

In formation of the hairline layer, a print ink including an acrylic resin may be used.

In coating of the clearcoat layer, at least one of an acrylic resin and a polyester (PE) resin may be used.

The refrigerator according to the present disclosure may include a main body, a storage compartment provided in the main body, and a door coupled to the main body to open and close at least one portion of the storage compartment. The door may include a PCM steel sheet.

The PCM steel sheet may include a steel sheet, a basecoat layer provided on the steel sheet to improve an exterior appearance, a hairline layer formed on the basecoat layer, a clearcoat layer provided on the hairline layer to improve durability, and a primer layer located between the steel sheet and the basecoat layer to provide adhesion.

The PCM steel sheet may be characterized in that a metal mesh layer is not formed.

The PCM steel sheet may have a brightness (flop index) of 20 or more.

According to an embodiment of the present disclosure, provided are a PCM steel sheet for home appliances having high brightness and a method for manufacturing the same. Also, provided is a refrigerator having improved exterior appearance by applying the PCM steel sheet for home appliances having high brightness.

According to an embodiment of the present disclosure, provided are a PCM steel sheet for home appliances having increased manufacturability and decreased quality deviation by omitting a metal mesh layer and a method for manufacturing the same.

According to an embodiment of the present disclosure, provided are a PCM steel sheet for home appliances having improved chemical resistance and boiling resistance by using an acrylic resin and a method for manufacturing the same.

The invention claimed is:

1. A pre-coated metal (PCM) steel sheet for a home appliance, the PCM steel sheet comprising:
- a steel sheet;
- a basecoat layer provided on the steel sheet;
- a hairline layer formed on the basecoat layer;
- a clearcoat layer provided on the hairline layer; and
- a primer layer between the steel sheet and the basecoat layer to provide adhesion between the steel sheet and the basecoat layer,
- wherein the hairline layer comprises an acrylic resin,
- the basecoat layer comprises a metallic pigment, the metallic pigment in the form of elliptical particles having a major axis of about 12 to about 18 μm, and
- the PCM steel sheet is without a metal mesh layer so that the PCM steel sheet has a brightness (flop index) of about 20 or more.

2. The PCM steel sheet according to claim 1, wherein the steel sheet comprises at least one steel sheet among an electrolytic galvanized iron (EGI) steel sheet and a galvanized iron (GI) steel sheet.

3. The PCM steel sheet according to claim 1, wherein the basecoat layer comprises an acrylic resin.

4. The PCM steel sheet according to claim 1, wherein the basecoat layer comprises a solvent with a boiling point of about 160° C. to about 220° C.

5. The PCM steel sheet according to claim 1, wherein the acrylic resin has a molecular weight (Mw) of about 70,000 to about 90,000.

6. The PCM steel sheet according to claim 1, wherein the clearcoat layer comprises at least one resin among an acrylic resin and a polyester (PE) resin.

7. The PCM steel sheet according to claim 1, wherein the primer layer comprises a black primer having a colorimetric L-value of about 20 to about 30.

8. A method for manufacturing a pre-coated metal (PCM) steel sheet for a home appliance, the method comprising:
- preparing a steel sheet,
- coating a primer layer on the steel sheet,
- coating a basecoat layer on the primer layer,
- forming a hairline layer on the basecoat layer, and
- coating a clearcoat layer on the hairline layer,
- wherein the PCM steel sheet is without a metal mesh layer,
- the basecoat layer comprises a metallic pigment, the metallic pigment in the form of elliptical particles having a major axis of about 12 to about 18 μm, and
- a print ink comprising an acrylic resin is applied in the forming of the hairline layer.

9. The method according to claim 8, wherein a black primer paint having a colorimetric L-value of about 20 to about 30 is applied in the coating of the primer layer.

10. The method according to claim 8, wherein an acrylic resin paint is applied in the coating of the basecoat layer.

11. The method according to claim 8, wherein a paint including at least one resin among an acrylic resin and a polyester (PE) resin is applied in the coating of the clearcoat layer.

12. A refrigerator comprising:

a main body;

a storage compartment in the main body; and a door coupled to the main body to open and close at least one portion of the storage compartment, wherein the door includes a PCM steel sheet, the PCM steel sheet including, a steel sheet;

a basecoat layer provided on the steel sheet;

a hairline layer formed on the basecoat layer;

a clearcoat layer provided on the hairline layer to improve durability; and a primer layer between the steel sheet and the basecoat layer to provide adhesion between the steel sheet and the basecoat layer, wherein the hairline layer comprises an acrylic resin, the basecoat layer comprises a metallic pigment, the metallic pigment in the form of elliptical particles having a major axis of about 12 to about 18 μm, and the PCM steel sheet is without a metal mesh layer so that the PCM steel sheet has a brightness (Flop Index) of about 20 or more.

13. The refrigerator according to claim 12, wherein the basecoat layer comprises an acrylic resin.

14. The refrigerator according to claim 12, wherein the clearcoat layer comprises at least one resin among an acrylic resin and a polyester (PE) resin.

15. The refrigerator according to claim 12, wherein the primer layer comprises a black primer having a colorimetric L-value of about 20 to about 30.

* * * * *